US007509514B2

(12) United States Patent
Courant et al.

(10) Patent No.: US 7,509,514 B2
(45) Date of Patent: Mar. 24, 2009

(54) METHOD AND DEVICE FOR THE SAMPLING OF DIGITAL DATA IN SYNCHRONOUS TRANSMISSION, WITH MAINTENANCE OF BINARY INTEGRITY

(75) Inventors: Pierre Courant, Cholet (FR); Christophe Marron, Cholet (FR)

(73) Assignee: Thales, Neuilly sur Seine (FR)

( * ) Notice: Subject to any disclaimer, the term of this patent is extended or adjusted under 35 U.S.C. 154(b) by 436 days.

(21) Appl. No.: 11/069,939

(22) Filed: Mar. 3, 2005

(65) Prior Publication Data
US 2005/0198549 A1 Sep. 8, 2005

(30) Foreign Application Priority Data
Mar. 5, 2004 (FR) .................................. 04 02351

(51) Int. Cl.
*G06F 1/12* (2006.01)
(52) U.S. Cl. .................. 713/400; 713/401; 713/500; 713/501; 713/502; 713/503; 713/600; 713/601
(58) Field of Classification Search .............. 713/400, 713/401, 500–503, 600–601
See application file for complete search history.

(56) References Cited

U.S. PATENT DOCUMENTS

| 4,972,442 | A | 11/1990 | Steierman | |
| 6,181,175 | B1 | 1/2001 | Wolf | |
| 6,347,128 | B1 * | 2/2002 | Ransijn | 375/376 |
| 6,415,325 | B1 * | 7/2002 | Morrien | 709/230 |
| 6,473,439 | B1 | 10/2002 | Abhyankar et al. | |
| 6,518,800 | B2 * | 2/2003 | Martin et al. | 327/94 |
| 2004/0233937 | A1 * | 11/2004 | Ruat et al. | 370/516 |
| 2005/0259754 | A1 * | 11/2005 | Ho et al. | 375/240.28 |

FOREIGN PATENT DOCUMENTS

EP 1075107 A 2/2001

* cited by examiner

*Primary Examiner*—Abdelmoniem Elamin
(74) *Attorney, Agent, or Firm*—Lowe Hauptman Ham & Berner, LLP

(57) ABSTRACT

The method is applicable to the reception of data in the case of a digital transmission in which the pieces of data are transmitted by a unit of equipment A to a unit of equipment B with an accompanying clock signal HA. This accompanying clock signal transmitted by the transmitter equipment A is used by the receiver equipment B to sample the transmitted data. An alternation is effected at the receiver equipment B between a phase of operation during which the clock signal HA accompanying the data is replaced by a local clock signal HLS of the same frequency and a phase of operation during which the local clock signal is periodically re-synchronized with the accompanying clock signal. Means to implement the method are also disclosed. The method makes it possible especially to maintain the integrity of the transmission as long as possible if the data-accompanying clock signal undergoes transient variations of frequency causing de-synchronization between the received data and the accompanying clock signal and a consequent loss of data.

5 Claims, 5 Drawing Sheets

METHOD AND DEVICE FOR THE SAMPLING OF DIGITAL DATA IN SYNCHRONOUS TRANSMISSION, WITH MAINTENANCE OF BINARY INTEGRITY

RELATED APPLICATIONS

The present application is based on, and claims priority from, France Application Number 0402351, filed Mar. 5, 2004, the disclosure of which is hereby incorporated by Reference herein in its entirety.

BACKGROUND OF THE INVENTION

The momentary disappearance of the clock signal that accompanies data is a major problem in the case of a synchronous transmission of digital data.

This phenomenon of clock signal loss appears especially when the link is set up by RF means in an electromagnetic environment disturbed by other transmissions. It can also appear in other types of links, for example wire links, especially as a consequence of line-coupling phenomena.

In the case of synchronous transmission, the loss of the clock signal generally leads to the loss of the associated data, as well as to the implementation of an often lengthy procedure for the general re-synchronization of the equipment. General re-synchronization procedures, when excessively frequent, result in a considerable reduction of the information transmission bit rate. The invention described and claimed in the present document deals with the way to resolve the problem posed by the momentary disappearance of the clock signal that accompanies the data in synchronous transmission. It is aimed at eliminating the operations of general re-synchronization, or at least spacing them out to the greatest possible extent.

In the context of the synchronous transmission of data (hereinafter called "synchronous transmission" for the sake of simplicity) the transmitter equipment simultaneously transmits payload data and a sequencing clock signal which the receiver equipment can use to sample and process the data satisfactorily. However, in certain circumstances, the sequencing clock signal may be highly disturbed. It may also completely disappear. In these circumstances, the receiver equipment generally uses a locally produced substitute clock signal. For the link to be maintained, the substitute clock signal must be as close as possible to the missing sequencing clock signal. Consequently, and if the loss of clock signal is brief, there is no loss of information bits. When the sequencing clock signal given by the transmitter equipment reappears, the receiver equipment once again uses the sequencing clock signal. The substitute clock signal is generally synthesized by the receiver element of the reception equipment, which is the upstream element in the reception chain. The clock signal substitution is generally done automatically without the downstream elements being informed.

In the most favorable cases, the substitute clock signal is a clock signal having the same frequency and the same stability as the sequencing clock signal coming from the transmitter equipment. The substitute clock signal may furthermore have been synchronized with the sequencing clock signal at a preliminary reset stage, for example when setting up a link or again during a general re-synchronization operation. However, even in this case, a drift appears over time between the transmitted clock signal and the local clock signal. In the event of the loss of the sequencing clock signal, this de-synchronization renders the sampling of the data through the local clock signal inefficient and swiftly leads to the loss of data bits.

The loss of data bits destroys the integrity of the data transmitted, generally causing the loss of complete frames, or even the totality of the transmitted message. It necessarily leads to the implementation of a procedure of re-synchronization as soon as the transmitted clock signal is again detected by the receiver equipment.

The phenomenon is of course aggravated and the loss of integrity is even faster if the local clock signal is of lower precision.

One approach to resolving this problem of de-synchronization consists in implanting a reference clock in the transmitter equipment and in the receiver equipment and regularly synchronizing the reference clocks. However, this solution is difficult to implement in practice. It necessitates, for example, the use of remotely re-synchronizable devices and proves to be costly in time and indiscreet.

SUMMARY OF THE INVENTION

To resolve this problem of de-synchronization related to the accidental loss of the data sequencing clock signal, the method of the invention is a method enabling the substitution of the received sequencing clock signal by a local clock signal produced internally and periodically re-synchronized with the sequencing clock signal. The invention also relates to a device implementing this method as well as to a preferred embodiment.

The method of the invention has the advantage of making it possible, most of the time, to remove the need for the transmitted clock signal and thus make the link less sensitive to possible undetectable drifts in frequency or transient transmission losses of the data sequencing clock signal in the link. Furthermore, through the method according to the invention, in the event of total loss of the transmitted clock signal during a time greater than the local clock re-synchronizing period, the maintenance of the transmission integrity or binary integrity is advantageously maintained for a maximum time, determined only by the precision of the clock signals. Furthermore, in the event of a halt in transmission, the method of the invention has the advantage of facilitating the re-synchronization of the local clock signal with the clock signal transmitted when transmission is resumed.

BRIEF DESCRIPTION OF THE DRAWING

Other features and advantages shall appear from the following description, made with reference to the following figures, of which.

DETAILED DESCRIPTION

Figure 1:
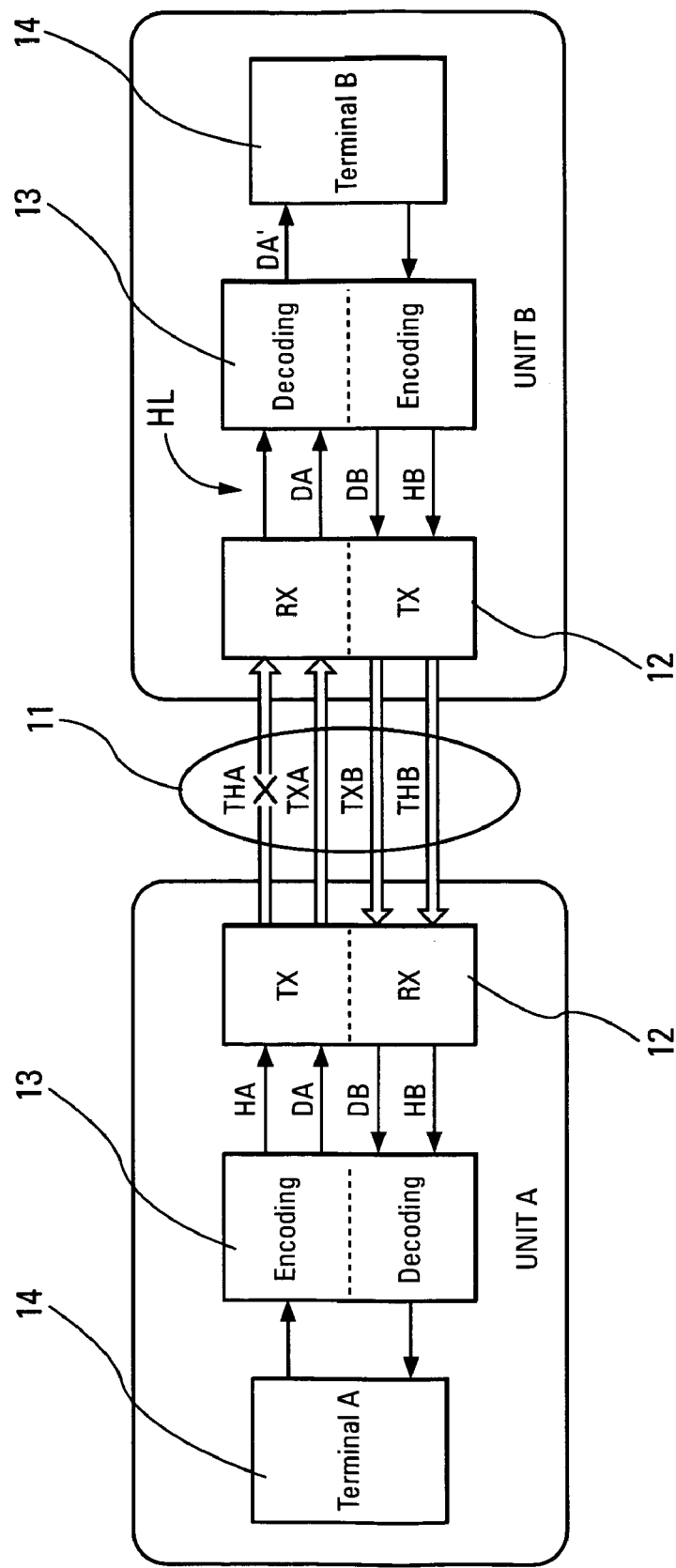
FIG. 1 is a simplified block diagram of a synchronized data transmission chain.

The transmission chain illustrated by the block diagram of FIG. 1 is presented by way of an example. It highlights the problem posed by disturbed reception of the sequencing clock signal accompanying the data in the case of synchronous digital data transmission. In general, a transmission chain between two units or pieces of equipment A and B brings into play the two units of equipment A and B as well as the channel 11 for the propagation of data between A and B.

This propagation channel may consist, for example, of a two-way electrical wire link, or again a radioelectrical link. Each of the units of equipment A or B has several sub-units: one sub-unit 12 to match the data with the transmission channel, one sub-unit 13 to condition the data and one sub-unit 14 to process and exploit the data sent.

The sub-unit 12 matches the data to the type of channel. In the case of radioelectrical transmission, this sub-unit may comprise, for example, a modulation-demodulation or modem stage, and a transmitter-receiver or transceiver stage. In the case of a wire link, this sub-unit may consist of a modern-type apparatus.

The sub-unit 13 or encoding-decoding sub-unit conditions and de-conditions the data. Data conditioning generally consists of an operation of encoding or signature computation whose purpose is to enable check for the absence of deterioration in the transmitted data. In the case of a transmission of pieces of data grouped in the form of frames or messages and comprising a header, this sub-unit may also have the role of separating data groups at reception. To do this, it must be capable of accurately sampling the pieces of data and identifying a group forming a whole. Similarly, in the case of the transmission of compressed or concatenated digital data, this sub-unit may, for example, have a role of decompressing or separating the data at reception. The pieces of data thus de-conditioned are sent to the terminal which processes and exploits them.

In the case of synchronous data transmission, the transmission channel 11 comprises for example a path TXA for the transmission of data from the unit of equipment A to the unit of equipment B accompanied by a path THA for the transmission of the associated sequencing clock signal. Symmetrically, the channel also has a path TXB for the transmission of data from the unit of equipment B to the unit of equipment A accompanied by a path THB for the transmission of the associated clock signal.

In a phase of normal operation, the pieces of data sent by the unit of equipment A are received by the unit of equipment B and sampled by means of a clock signal directly coming from the clock HA accompanying the pieces of data.

In the case of a break in the path THA or deterioration of this path, an attempt to maintain the working of the transmission is made by the substitution of a local clock signal HL for the deficient clock signal HA. This local clock signal has the same nominal frequency as the normally transmitted clock signal. It is given for example by the sub-unit, i.e. the transmitter-receiver or modem as the case may be, which matches the data with the transmission channel. This is the unit located furthermost upstream in the reception chain.

The local clock signal HL is transmitted automatically, as a replacement for the deficient clock signal HA, to the decoding sub-unit which uses it to shape the received data.

This clock substitution results in a de-synchronization between the received data and the clock signal used to sample this data. The de-synchronization takes the form, concretely, of a loss of data bits which, for example, may lead to an error in the decoding of the data. A decoding error generally leads to the loss of all the following frames. The de-synchronized transmission is then interrupted and a re-synchronization procedure has to be implemented.

It must be noted that, in the event of a loss of the clock signal HA accompanying the data, the effects of the de-synchronization between the local clock signal and the transmitted data will be felt all the more swiftly as the local clock signal and the transmitted clock signal have different precision and stability values in terms of frequency.

Figure 2:
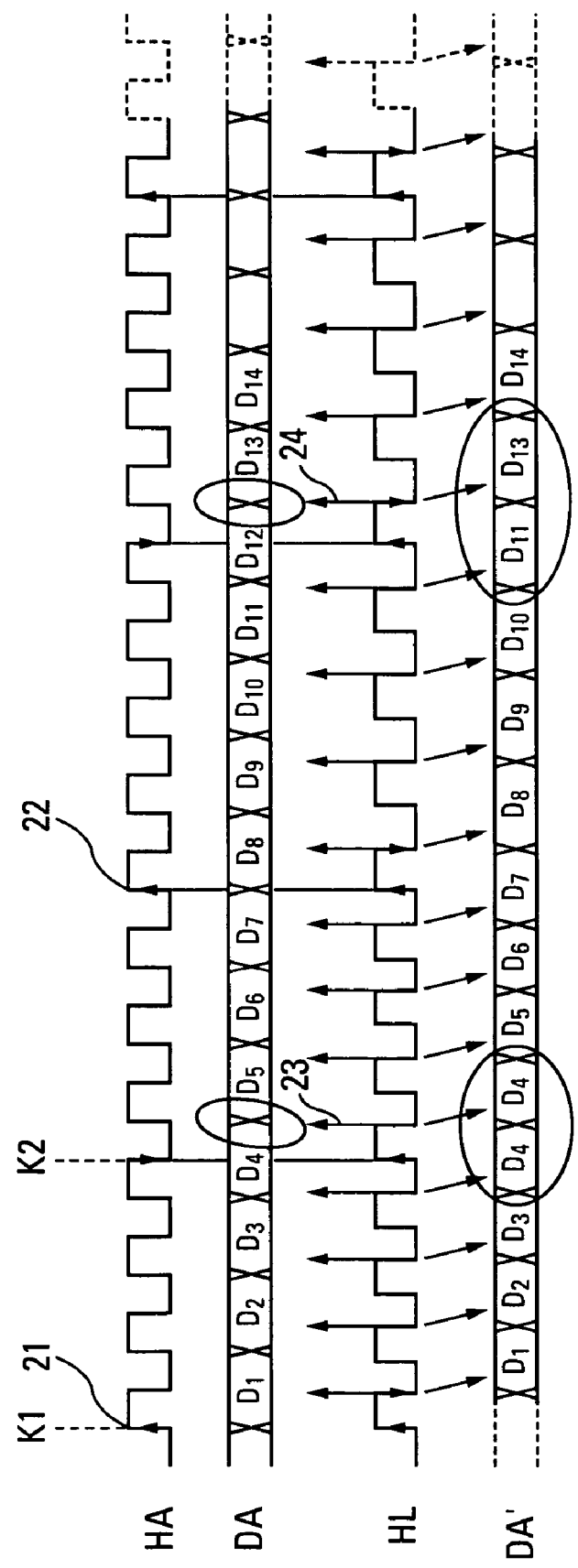
FIG. 2 is a timing diagram illustrating the notion of loss of binary integrity.

FIG. 2 is a timing diagram illustrating the effects induced by the substitution of a local clock signal HL for the clock signal HA accompanying data DA, during the operation for sampling the data Da. In the example of the figure, which corresponds to practice, the two clocks HA and HL have the same nominal frequency $F_0$. By contrast, the two clocks have different frequency precision and stability values. The difference in precision is expressed by a difference in frequency, while the difference in stability is expressed, if HA is taken as a reference, by a relative variation of the frequency of HL relative to the frequency of HA in the course of time. All this finally takes the form of a sliding of the position of the leading edges of the clock signal HL relative to the position of the leading edges of HA and by a variation of the data sampling instant relative to the instant of appearance. In the example of FIG. 2, the instants of appearance of the data are given by the leading edges of the clock signal HA. As for the sampling of the data, it is done at instants corresponding to the trailing edges of the clock signal HL. Furthermore, the example of FIG. 2 illustrates a situation in which the clock signal HL is less stable than the clock signal HA, the frequency of HL being higher than that of HA between the instants 21 and 22, while it is lower after the instant 22.

In a normal situation of operation for which the sampling of the data is done by means of the clock signal HA, a sampling of the data achieved at the instant of appearance of the trailing edges of HA makes it possible to achieve a systematically accurate sampling of the data. Indeed, since the sampling is done at instants distant from the data set-up phases, the sampled data has a stable value.

By contrast, in the event of disturbance, the position in time of the sampling instant relative to the data set-up instant becomes fluctuating. Situations then arise where the sampling occurs at an instant when a piece of data is being set up. The result of the sampling is then uncertain and may lead to an erroneous piece of data DA'. In the example of FIG. 2, such incidents occur at the instants 23 and 24. In the former case, since the clock signal HL has a frequency higher than that of the clock signal HA, the relative sliding of the edges of the clock signals leads to the double sampling of the piece of data $D_4$. In the latter case, the clock signal HL has a frequency lower than that of the clock signal HA and the sliding of the edges leads to the absence of sampling of the data $D_{12}$. In both cases, an erroneous piece of data DA' is obtained.

The illustration of FIG. 2 shows, as stated here above, that the greater the precision and stability of the clock signal HL and HA, the later will the consequences of the relative sliding of the clock signal edges occur.

Thus, by way of an example, we may consider two clock signals HL and HA with a frequency $F_0$, the clock signal having identical precision values equal to $\pm 10^7$. The frequency deviation between the two clock signals is equal to $210^{-7} * F_0$. Starting from the instant $t_1$, when the leading edges of the two clock signals are synchronized, a lag or discrepancy arises in the course of time between the leading edges. This lag grows by a value substantially equal to $2*10^{-7}*T_0$ at each period of a clock signal HA, $T_0$ being equal to $1/F_0$. Consequently, at the end of a time $T_m$ substantially corresponding to $5*10^6$ clock periods, a time lag with a maximum value equal to $T_0$ is got. This shift necessarily results in an erroneous sampling of the data received. Similarly, if the clock signal HL and HA have a precision equal only to ±5*10⁻⁵, the time $T_m$ will corresponds to $10^4$ clock signal HA periods.

In the example shown in FIG. 2, the pieces of data whose rate is set by the clock signal HA are sampled on the trailing edge of HL. In this type of configuration, which is a common configuration, it is observed that, with the clock signals being synchronized at the instant $t_1$, the loss of binary integrity, which corresponds to the sampling of an erroneous value, appears at the end of a time $t_2$ corresponding to a lag between leading edges equal to a half-period of the clock signal HA. In this configuration of operation, again taking the values and the reasoning of the previous example, it can be seen that, with the clock signals HL and HA having a precision of ±10⁻⁷, the binary integrity will be lost at the end of a time equal to $2.5*10^6$ periods of the clock signal HA, namely after the sampling of $2.5*10^6$ pieces of binary data corresponding for example to 312500 information bytes. By contrast, if HA and HL have a precision value of only ±5*10⁻⁵, the binary integrity will be lost far more rapidly. The binary integrity, in this case, will be lost after the sampling of $5*10^3$ piece of the binary data, corresponding for example to 625 bytes.

The illustration of FIG. 2 therefore makes it possible to clearly discern the problem that arises when, following a loss of the clock signal HA, it becomes necessary to sample the data received with a local clock signal. It is also noted, through digital samples, that even if HL and HA have a low frequency difference, the loss of binary integrity in the longer or shorter term is inevitable. This loss of integrity leads to a halt in transmission and the implementation of a re-synchronization that is costly in time.

Figure 3:
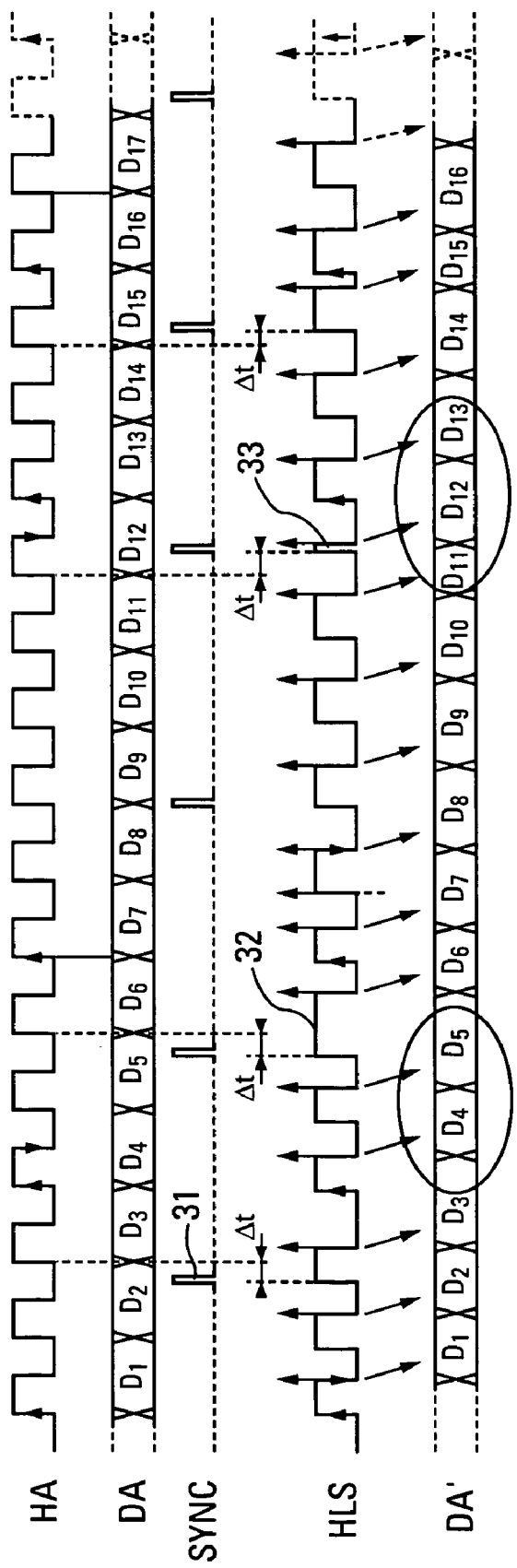
FIG. 3 is a timing diagram illustrating the principle of clock signal re-synchronizing.

FIG. 3 is a second timing diagram providing an illustration, relative to an example, of the principle of the method according to the invention by which the binary integrity can be preserved as long as possible when the transmission of the clock signal HA is disturbed. The method of the invention is based on the permanent use of a local clock signal HLS, periodically synchronized with the clock signal HA accompanying the data. To do this, the time lag between the leading edges of the clock signals HA and HLS is measured, for example, permanently. At the same time, periodically, at instants expressed by the pulses 31 constituting the periodic signal SYNC, the method of the invention re-synchronizes HLS with HA. The synchronization results in a lengthening or reduction on a period equal to the duration of the clock pulse HLS, so that the clock signal HA and HLS become synchronous again.

By way of an example, FIG. 3 takes up the initial configuration shown in FIG. 2. This FIG. 3 shows the clock signal HA normally accompanying the transmitted data, as well as the local clock signal HLS design to sample the data. However, unlike in the example of FIG. 2, the local clock signal HLS is no longer totally independent of the clock signal HA. It is periodically re-synchronized, the re-synchronizing operation being performed at the rate of the signal SYNC.

Depending on whether the leading edge of the clock HLS is in advance or delayed relative to the corresponding leading edge of the clock signal HA, the re-synchronization operation carries out an adjustment of HLS causing the creation of a pulse 32 of lengthened duration or a pulse of shortened 33 duration.

FIG. 3 shows that, provided it is done at the right time, the re-synchronization has the consequence of preventing the appearance of erroneous data. One condition for erroneous data not appearing is that the correction of the time difference between the leading edges of the clock signals HLS and HA, should be achieved frequently enough for the difference measured to be no greater than a half-period of the clock signal HA. In this way, as shown here above, the binary integrity is indefinitely preserved.

Through the illustration of FIG. 3, it is also seen that the periodic re-synchronization of the clock signal HLS results in a periodic transient variation of the duration of the clock pulse HLS, also known as jitter. This effect is all the less perceptible as the operation of re-synchronization is done less frequently.

From the above two observations, it can therefore be concluded that the implementation of the method of the invention relies on the use of a synchronization signal, synchronous with the clock signal HLS for example, whose period is high enough to restrict the jitter effect and low enough to ensure the preservation of the binary integrity of the signal.

Figure 4A:
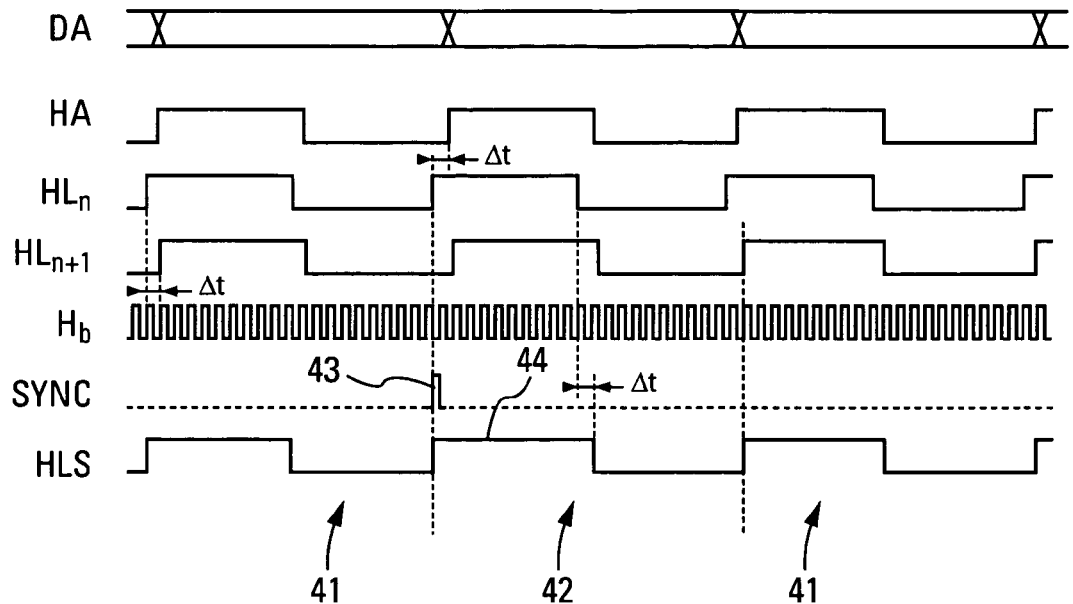
FIG. 4 is a timing diagram illustrating the method according to the invention.
Figure 4B:
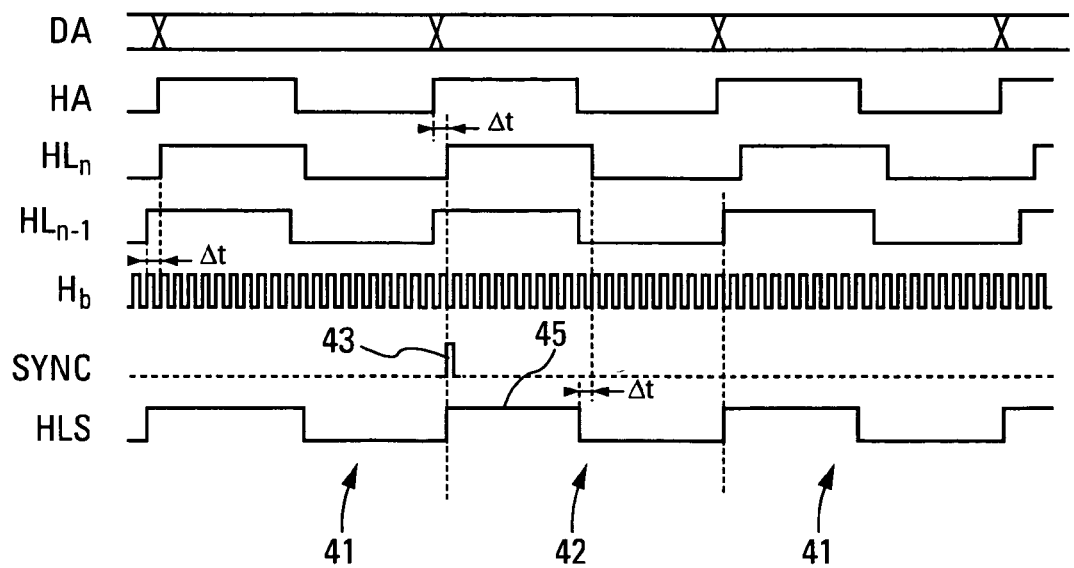

FIG. 4 illustrates a possible way of implementing the method of the invention and especially of obtaining the clock signal HLS. FIG. 4 presents the implementation of the method according to the invention in two distinct timing diagrams 4a and 4b, depending on whether the frequency of the clock signal HLS is higher (timing diagram 4a) or lower (timing diagram 4b) than that of the clock signal HA accompanying the data.

The method according to the invention consists, in practice, in constructing a local clock signal HLS from a set of N clock signals $HL_i$. The clock signals $HL_i$ have a same frequency $F_l$ equal to the frequency $F_b$ of a base clock $H_b$ divided by N. Thus, it is possible to write:

$F_l=F_b/N$.

The clock signals $HL_i$ have a particular feature of being temporally offset relative to one another by a duration $T_b$ equal to the period of the base clock.

Furthermore, with the precision values of the clock signals HA and HLS being known, the method of the invention relies on the determining of the minimum time interval ΔT at the end of which the time lag δt between the leading edges of the clocks HLS and HA becomes greater than $T_b$, and on the performance of the operations of re-synchronization having a periodicity as close as possible to ΔT and below ΔT.

Thus, with ΔT being known, the method of the invention can be described as a method for the generation of the clock signal HLS alternating two phases of operation:
 a stabilized phase 41 extending between two operations of re-synchronization, during which the clock signal HLS is made to correspond with a clock signal $HL_n$ selected from among the N clock signals $HL_i$;
 a phase 42 whose start is marked by the pulse 43 during which the lag or difference between the leading edges of HLS and HA is measured and HLS is modified so as to make it correspond to the clock signal $HL_{n-1}$ or to the clock signal $HL_{n+1}$, depending on whether HLS is in advance or delayed relative to HA.

The alternation of these two phases of operation ensures that the temporal difference between the leading edges cannot exceed one Nth of the period of HLS. This condition is sufficient to ensure that the binary integrity of the link between units is assured.

The timing diagram 4a illustrates the case where the frequency of HLS is higher than the frequency of HA. In this case, it is observed that, during the HLS modification phase 42, the period of the clock signal HLS undergoes a lengthening equal to the difference $T_b$, which means a lengthening of the duration of the high state 44.

The timing diagram 4b for its part illustrates the opposite case in which the frequency of HLS is lower than the frequency of HA. In this case, it can be seen that, during the HLS modification phase 42, the period of the clock signal HLS undergoes a shortening equal to the difference $T_b$, which results in a shortening of the duration of the high state 45.

Figure 5:
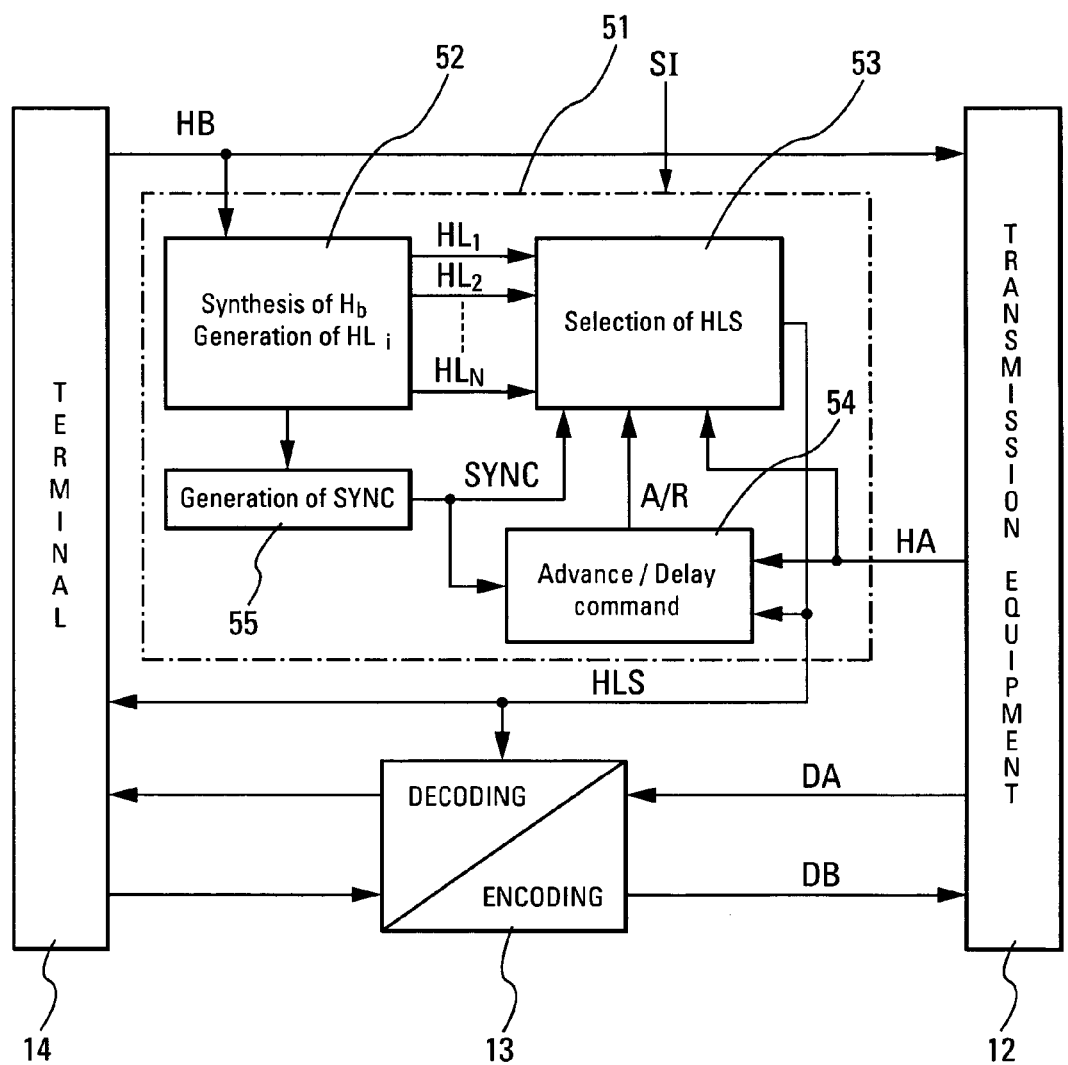
FIG. 5 shows a preferred embodiment of the device implementing the method according to the invention.

FIG. 5 shows the block diagram of a device used to implement the method according to the invention. The illustration of FIG. 5 presents the device, in a preferred embodiment, as an element integrated into the unit of equipment B of FIG. 1. In practice, the device is designed to be integrated with all the linked-up units.

The device 51 of the invention has four modules that can be used to perform the four functions by which the method of the invention can be implemented:
- the module 52 which generates the N clock signals $HL_i$,
- the module 53 which selects the clock signal $HL_n$ corresponding to HLS between the two re-synchronization operations,
- the module 54 which measures the lag between the leading edges of HA and HLS and generates the binary command A/D to select $HL_{n-1}$ or $HL_{n+1}$ for the re-synchronization operation,
- the module 55 for generating the synchronization signal that defines the duration of the period extending between two successive re-synchronization operations.

The main function of the module 52 is to set up the base clock signal $H_b$ from the internal reference clock signal of the unit of equipment B. This base clock signal $H_b$ has a frequency substantially equal to N times the frequency of the clock signal HLS. The clock signal $H_b$ may be synthesized, for example, by means of a device comprising a phase-locked loop from the reference clock signal. This reference clock signal, as in the figure, may be the clock signal HB that accompanies the data DB sent by the unit of equipment B.

The base clock signal $H_b$ is then re-divided by N to produce N successive clock signals $HL_i$, each being temporally offset (or time-lagged) by the duration of one period of $H_b$ relative to the lower-ranking clock signal and to the higher-ranking clock signal. The module 52 thus delivers N clock signals to the selection module 53, the leading edge of the clock signal $HL_n$, as illustrated in FIG. 4, being in advance or delayed by a period of Hb relative to the leading edges of $HL_{n-1}$ and $HL_{n+1}$.

The module 53 carries out the synthesis proper of the clock signal HLS from the n clock signals $HL_i$ given by the module 52 according to the following mechanism.

Between two synchronization phases 42, the synthesized clock signal HLS is a copy of the clock signal $HL_n$ which is the clock signal selected during the last re-synchronization operation. Then, during the next synchronization phase, under the impulse of the A/R binary command, the module 53 replaces the clock signal $HL_n$, with the clock signal $HL_{n+1}$ or the clock signal $HL_{n-1}$ which are more synchronized with the clock signal HA than the clock signal $HL_n$. The clock signal $HL_{n-1}$ or $HLn+_1$ thus selected is then held throughout the stabilized phase 41 that follows, until the next re-synchronization implemented under the impulse of the signal SYNC.

The substitution of the clock signal $HL_{n-1}$ or $HL_{n+1}$ for the clock signal $HL_n$ is illustrated in FIG. 4. It is done by the module 53 without any appearance of discontinuity in the clock signal HLS. It results only in a lengthening or shortening of the clock signal HLS by one period.

Thus, at the rate of appearance of the signal SYNC, the clock signal HLS successively copies one or other of the N clock signals given by the module 52.

The module 54 synthesizes the binary command A/R whose role is to tell the module 53 whether the clock that has to be selected after the clock $HL_n$ for the next stabilized phase is $HL_{n-1}$ or $HL_{n+1}$.

The command A/R may be prepared for example from the measurement of the difference existing between the leading edges of HLS and HA at the appearance of the signal SYNC. Thus if, for example, the first leading edge of HLS that follows the appearance of the signal SYNC is in advance of the first edge of HA following this appearance, the binary command A/R takes the value, 0 or 1: this informs the module 53 that the clock signal to be selected is $_{HLn-1}$. Conversely, if this is not the case, the command A/R takes the value, respectively 1 or 0, that informs the module 53 that the clock to be selected is $_{HLn+1}$.

The module 55 is the module responsible for the synthesis of the signal SYNC which activates the re-synchronization operation. The signal SYNC is constituted, for example, by a periodic sequence of pulses. Its period is especially a function of the minimum time interval $\Delta T$ at the end of which, given the precision and stability of the clock signals HLS and HA, the time lag $\delta t$ between the leading edges of the initially synchronous clock signals HLS and HA becomes greater than $T_b$.

The synthesis of the signal SYNC may be advantageously achieved, for example, by simple counting, from the clock signal $H_b$ given by the module 52. The module 55 can then even be integrated into the module 52.

In enabling the continued use of an internal clock signal for the sampling of the received data, the implanting of a device implementing the method of the invention in a transmission unit has the advantage of offering the possibility, in certain circumstances, of significantly increasing the time during which the binary integrity of the transmission is maintained. The poorer the conditions of transmission, the greater the extent to which this advantage can be measured. In particular, the importance of this advantage can be assessed by considering three typical cases: the case of undisturbed operation, the case of operation comprising periods of disturbance that are brief and spaced out and the case of operation that is totally disturbed with the disappearance of the data-accompanying clock signal HA.

In the case of undisturbed operation, the use of a periodically re-synchronized internal clock signal HLS makes it possible to indefinitely maintain the binary integrity of the link. Everything happens as if the sampling of the transmitted data were to be made with the data-accompanying clock signal.

In the case of operation disturbed by brief disappearances of the data-accompanying clock signal HA, the use of this clock signal to sample the received data leads to a rapid loss of the binary integrity of the link, the absent clock being then replaced by any local clock sometimes with lower precision. By contrast, the use of a re-synchronized internal clock signal HLS enables the binary integrity to be maintained, lengthily or even indefinitely inasmuch as the clock signal accompanying the data is present during the re-synchronization phase.

In the case of totally disturbed operation, the use of a clock signal HLS proves to be equally advantageous. Indeed, in the event of a permanent loss of the data-accompanying clock signal HA, the local clock signal HLS maintains the binary integrity for a time $\Delta T$ which, by definition, is at least equal to the period of re-synchronization, whereas the direct use of the clock signal HA generally leads to a rapid loss of binary integrity.

The efficiency of the method according to the invention can be highlighted with reference to the simple numerical example developed here below in the document, in taking up the illustration of FIG. 1.

The example considered is that of a piece of equipment B receiving data from a piece of equipment A by RF means at the rate of two Mbits/s, this data being sampled directly by means of the clock signal HA. It is furthermore assumed that the reference clock signals HA and HB have a precision of $\pm 10^{-7}$ and that the local clock signal HL given by the sub-unit 12 to the sub-unit 13 in the event of a loss of the clock signal HA, has a precision of $\pm 5\ 10^{-6}$. This assumption corresponds, in the example, to the fact that the substitute clock signal is given by a sub-unit whose high working frequency does not have a precision as great $\pm 10^{-7}$.

In such a configuration, in normal operation, the binary integrity is naturally maintained indefinitely. By contrast, in the event of a loss of the clock signal HA, a simple computation not described in detail in this is document shows that, since the clock signals are not synchronized, the binary signal, in the most optimum case, will be maintained for a maximum time of $\Delta T_i$ corresponding to the sampling of about $10^5$ pieces of binary data, that is, for 50 ms. As stated here above, this maximum time $\Delta T_i$ is given by the number of periods of the clock signal HA at the end of which the initially synchronous leading edges of HL and HA show, for the first time, a difference equal to or greater than a half-period of HA.

It must be noted that the optimum case corresponds to a situation in which the leading edge of the substitute clock signal is, by chance, synchronous with the leading edge of HA at the point in time when the latter disappears. In most cases, the binary integrity is ensured only for a brief instant.

Similarly, if the local clock signal HL has precision equal to $\pm 10^{-7}$, the binary integrity, in the most optimum cases, will be preserved for a maximum time corresponding to the sampling of about $2.5*10^6$ pieces of binary data, that is for 1.25 s.

We then consider a piece of equipment B comprising a device implementing the method according to the invention. This piece of equipment uses a local clock signal HLS whose precision is identical to that of the clock signal HA, namely $10^{-7}$. In normal operation, this clock signal is periodically re-synchronized with the clock signal HA and, after re-synchronizing, only has a difference equal to one Nth of the reference clock signal, for example HB, from which HLS is constructed. This minor difference makes it possible to maintain the binary integrity indefinitely as is the case for a piece of equipment not having a device according to the invention. By contrast, if the clock signal HA is lost, owing to the synchronization of the clock signals HA and HLS, the binary integrity of the link will be effectively maintained, in all circumstances, for a time substantially equal to the time $\Delta T_i$. Thus, in any circumstance, there will be a maintaining of binary integrity at least substantially equal to $\Delta T_i$, which corresponds in the example to the maintaining of the binary integrity for at least 1.25 s.

What is claimed is:

1. A method of sampling data sequenced by a clock signal HA and transmitted from a unit of equipment A to a unit of equipment B with maintenance of binary integrity, the method comprising steps of:

sampling by equipment B, the data by means of a local clock signal HLS, this clock signal working autonomously, a synchronizing during which the local clock signal HLS, while sampling the transmitted data, is synchronized with the clock signal HA which sequences the data, wherein said sampling step and said synchronizing step are repeated in alternation; and, wherein the passage from said sampling step to the synchronizing step is done at the appearance of a synchronization signal constituted by periodic pulses.

2. The method according to claim 1, wherein, during the synchronization step, the time interval between the leading edges of the clock signals HA and HLS is measured so as to determine whether the leading edge of HLS is in advance or delayed relative to the leading edge of HA.

3. The method according to claim 2, wherein, during the synchronization step, the period of the clock signal HLS is modified during a clock cycle so that the leading edges of the clock signals HLS and HA are synchronous at the next cycle.

4. The method according to claim 3, wherein, when the leading edge of HLS is in advance, the clock signal HLS has a lengthened cycle while, if the leading edge of HLS is delayed, the clock signal HLS has a shortened cycle.

5. The method according to claim 1, wherein the period of the synchronization signal is such that, between two phases of re-synchronization and for a chosen value N, the time interval between the leading edges of HLS and HA does not become greater than a value equal to one Nth of the period of the clock signal HA.

* * * * *